(12) United States Patent
Lukanov et al.

(10) Patent No.: US 12,149,537 B2
(45) Date of Patent: Nov. 19, 2024

(54) RESOURCE ACCESS CONTROL IN CLOUD ENVIRONMENTS

(71) Applicant: VMware Inc., Palo Alto, CA (US)

(72) Inventors: Stanimir Lukanov, Sofia (BG); Georgi Lyubomirov Dimitrov, Sofia (BG); Georgi Lekov, Sofia (BG)

(73) Assignee: VMware LLC, Palo Alto, CA (US)

( * ) Notice: Subject to any disclaimer, the term of this patent is extended or adjusted under 35 U.S.C. 154(b) by 312 days.

(21) Appl. No.: 17/574,306

(22) Filed: Jan. 12, 2022

(65) Prior Publication Data

US 2023/0224304 A1 Jul. 13, 2023

(51) Int. Cl.
*H04L 9/40* (2022.01)

(52) U.S. Cl.
CPC ........ *H04L 63/105* (2013.01); *H04L 63/0853* (2013.01); *H04L 63/20* (2013.01)

(58) Field of Classification Search
CPC ... H04L 63/105; H04L 63/0853; H04L 63/20; H04L 63/102; H04L 63/104
See application file for complete search history.

(56) References Cited

U.S. PATENT DOCUMENTS

| | | | | |
|---|---|---|---|---|
| 8,973,108 | B1 * | 3/2015 | Roth | G06F 21/00 726/28 |
| 9,774,586 | B1 * | 9/2017 | Roche | H04L 63/08 |
| 10,044,723 | B1 * | 8/2018 | Fischer | H04L 63/102 |
| 10,878,079 | B2 * | 12/2020 | Vepa | G06F 21/335 |
| 11,095,506 | B1 * | 8/2021 | Erblat | H04L 41/0813 |
| 2015/0373004 | A1 * | 12/2015 | Hopkins | G06F 16/278 726/6 |
| 2018/0075231 | A1 * | 3/2018 | Subramanian | H04L 63/0807 |
| 2020/0257700 | A1 * | 8/2020 | Xu | G06F 8/65 |
| 2020/0274881 | A1 | 8/2020 | Lukanov et al. | |
| 2020/0314167 | A1 * | 10/2020 | Achyuth | H04L 63/107 |

(Continued)

FOREIGN PATENT DOCUMENTS

WO WO-2013049461 A2 * 4/2013 ......... H04L 63/0815

OTHER PUBLICATIONS

Zhai et al.; "CQSTR: Securing Cross-Tenant Applications with Cloud Containers", 2016 ACM, pp. 223-236. (Year: 2016).*

*Primary Examiner* — Matthew Smithers
(74) *Attorney, Agent, or Firm* — Kim & Stewart LLP

(57) ABSTRACT

Access control management to shared resources in a common resource directory between different users of cloud data centers can be implemented as computer-readable methods, media and systems. A resource managing service receives a request to access resources of a resource directory managed by the resource managing service. The request includes a token for identity authentication. The resource managing service determined a container membership associated with the token, where the container membership is associated with a container from a set of containers for the resource directory. The container includes one or more resources in a tree data structure of the resource directory. The resource managing service filters access rights defined in authorization primitives associated with the container membership based on container policy rules for the set of containers in the resource directory. The resource managing service provides access to a set of resources from the resource directory.

24 Claims, 4 Drawing Sheets

(56) References Cited

U.S. PATENT DOCUMENTS

| | | | |
|---|---|---|---|
| 2021/0081252 A1* | 3/2021 | Bhargava | G06F 9/5072 |
| 2022/0263835 A1* | 8/2022 | Pieczul | H04L 63/105 |
| 2023/0061080 A1* | 3/2023 | Singh | H04L 63/20 |
| 2023/0077424 A1* | 3/2023 | Pabón | G06F 3/0644 |
| | | | 711/154 |
| 2023/0153449 A1* | 5/2023 | Li | H04L 63/102 |
| | | | 726/4 |

* cited by examiner

RESOURCE ACCESS CONTROL IN CLOUD ENVIRONMENTS

BACKGROUND

This specification relates to access control management to resources provided in a cloud computing environment and shared between multiple principals.

Software complexity is increasing and causes changes to lifecycle management and maintenance of software applications and platform systems. Software applications and systems can provide services and access to resources in cloud computing environments. Customer's needs are transforming and require flexibility in terms of processes and computing environments, as well as high availability to access software and hardware resources provided by the underlying platform infrastructure.

In some cases, one cloud platform can share and distribute resources to multiple customers having separate accounts and access rights. If customers access resources provided by the cloud platform in a way that do not correspond to their scope of access, the cloud platform may experience disruptions or issues affecting responsiveness of running software applications, service, and databases. Disruptions at the cloud platform may be associated with disruptions of services provided to external entities, including some of the customers of the cloud platform or other connected systems or services.

A cloud computing environment can include thousands of host computing devices, virtual machines (VMs), and networking components that service an increasing number of customers. The cloud computing environment can manage data security and integrity to ensure that executed operations are compliant with authorizations provided to different users or groups of users of services running in the cloud computing environment. One conventional way to provide data security is through role-based access control (RBAC) techniques.

SUMMARY

This specification describes technologies relating to access control management and usage in cloud computing environments.

Particular embodiments of the subject matter described in this specification can be implemented so as to realize one or more of the following advantages.

Using techniques described in this specification, access controls for sets of resources in a resource directory can be managed more reliably and flexibly. Container definitions can map sets of resources as containers to relevant target principals. The containers can be defined within a single directory hierarchical structure. Containers can facilitate distribution of resources in a common structure to multiple different target audiences in a secure yet reliable manner. Containers can be defined to map to container memberships to evaluate whether a user logged-in with an access token has authorization rights to one or more containers. The cloud service can define different target principals with permissions to managed resources corresponding to a relevant authorization scheme and container policies defined for containers mapped to the target principals. Thus, access rights that can be determined from primitives defined in authorization schemes for access control can be filtered to propagate access rights to resources in the directory based on container membership evaluations. Determination of access rights according to configuration of containers associated with container memberships provide a centralized approach for configuring permissions that can be more easily maintained while spending fewer resources to modify.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
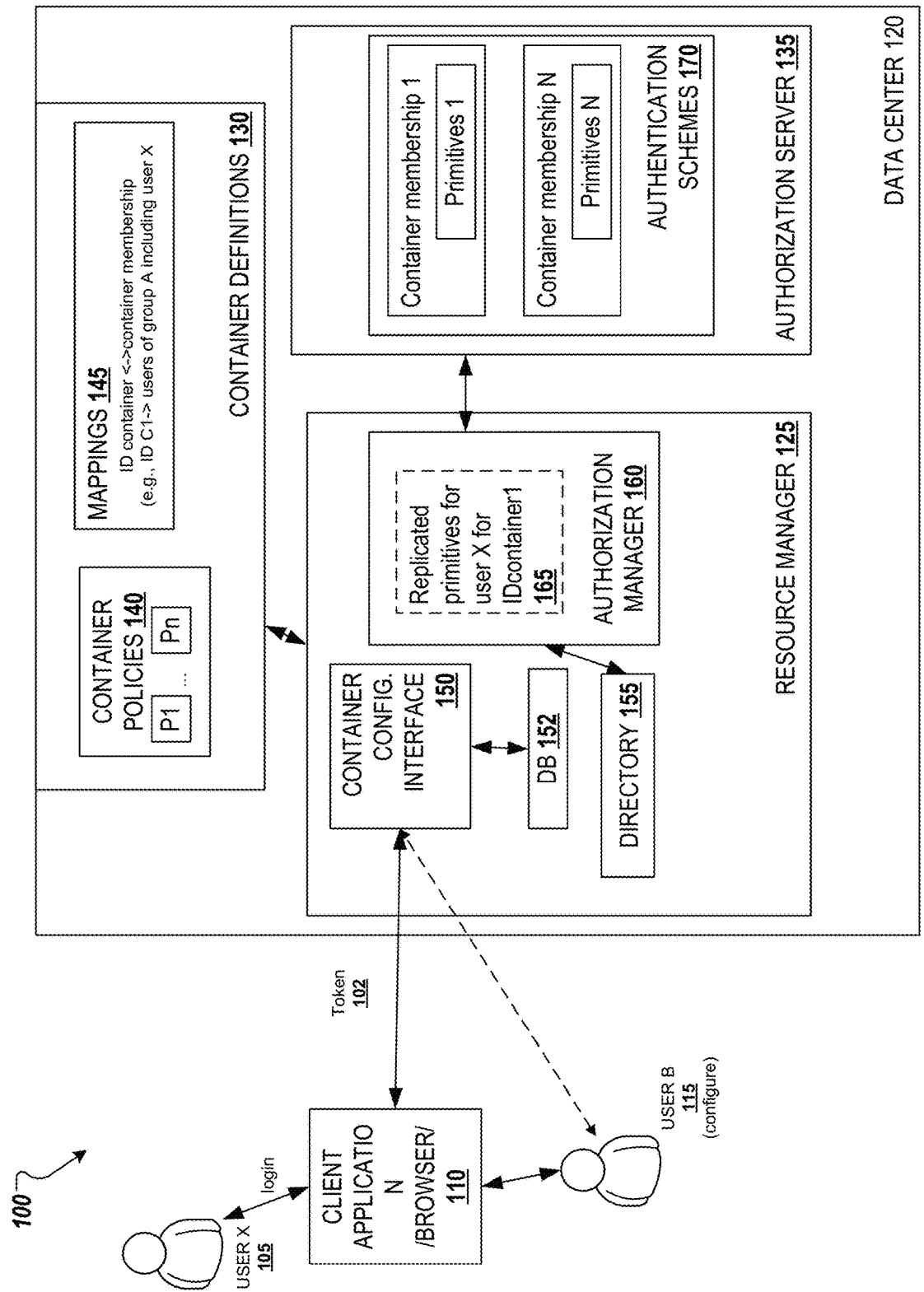
FIG. 1 is an example of a schematic diagram of a cloud environment illustrating configuration of containers including resources of a hierarchical resource directory of a resource managing service using container membership definitions.

This specification describes techniques for access control management for resources provided in a cloud environment.

In a cloud-services computing environment, a RBAC-based access control model is an approach to control cloud access based on roles assigned to principals. A security principal is a computer-implemented object representing a user, a group of users, a service, or a computer. A user, a group of users, a service, or a computer can request access to systems and resources (e.g., files, directories, virtual machines, and applications, among other examples) in a cloud environment. A role represents a collection of permissions or access privileges (e.g., a list of permitted operations) with respect to a resource system in the cloud environment.

In some embodiments, a cloud service provides access to a resource system providing resources that can be organized in a hierarchical structure, for example, a tree structure. In such resource systems, access control settings of a parent node in the tree structure of the file directory propagate to a child node and/or to a child sub-directory (e.g., a child file directory). In some instances, the resource system may organize resources as nested sub-trees where one sub-tree can include multiple sub-trees organized under a common root node. When access control settings are propagated to child nodes and/or child sub-directories, the child nodes and/or child sub-directories can have the same access control settings as the parent node and/or the parent sub-directory.

In some instances, one resource system may provide resources as a cloud service to multiple customers, users, or other entities, where different customers may have access to different subsets of resources from all the resources of the resource system. In some instances, a security principal (e.g., a cloud service provider, a customer of the cloud service, etc.) may have access to predefined sub-trees of the file directory of resources in the resource system. In those instances, another principal may have overlapping access to some (but not all) of the resource, may have no overlapping access with the resources available to the first customer, may have completely overlapping access.

For example, a hierarchical system in a cloud-services computing environment may include files uploaded by both a tenant and a service provider of a resource managing cloud service. The tenant can be defined as a group of users (e.g., users defined for a given customer of a cloud platform or a cloud service provided on the cloud platform) who share a common access with specific privileges to a software instance (e.g., cloud service, cloud application, etc.). In some cases, the service provider may want to restrict the tenant's access to some or all of the resources. For example, a service provider may want to restrict access to one or more nodes or a sub-directory of nodes from the resource structure. However, due to the propagation nature of the RBAC-based model that is used to orchestrate access control to resources, such a restriction to the one or more nodes or a sub-directory of nodes may not be readily performed. Thus, there can be a need for the cloud service to flexibly adjust and manage access control settings for resources provided by a hierarchical system to multiple principals when access control settings are obtained by propagation using the RBAC-based model.

Sharing access to resources provided in a hierarchical directory in a common resource system can be complex and time consuming because it requires filtering access rights provided to a subset of users (e.g., corresponding to a given user role, user group, or complying with a filtering rule) defined for a given tenant when determining access for resources in the hierarchical directory.

In some cases, the cloud service provides a user role within a tenant account, for example, the role of an administrator, with full set of privileges for accessing resources, however, it can be desirable that those privileges are given only for resources that are available for that tenant account (e.g., a portion of all the resources). A typical RBAC model can be defined to provide control on access rights which principals have on the objects (e.g., resources, files, etc.) in a resource directory. The RBAC model can provide such access control with the help of permissions defined for a user and for a certain object(s) in the resource directory. The cloud service can define the access control for a single object or for the object and its children (e.g., a sub-tree of the resource directory).

Rights management can enable restrictions at an operation level, a user or a role level, or a system/service level. The RBAC model can define authorization primitives including:
privilege—defines discrete rights that are required to perform an operation;
role—a group of privileges gathered together to enable a principal to execute a set of operations;
permission—a unique tuple of principal, role and object.

In some implementations, a cloud data center manages access controls according to an authorization model based on the RBAC model. In case where the RBAC model is used for the access control for entities part of a resource directory, determined permissions for one entity (e.g., resource, file) are propagated to apply to child resources to that first root entity. Thus, permissions provided to a root node of a sub-tree of the resource directory are propagated to all child nodes in the sub-tree. In some instances, different sub-trees may be associated with different tenants, or user groups, or other criteria for determining relevant principals provided with access to resources part of relevant subtrees.

The cloud data center can associate different sets of resources in a resource directory (that has a hierarchical data structure) with different destination principals provided with access rights to perform operations on the set of resources. In those cases, the cloud data center defines containers and container memberships for respective sets of resources within the resource directory to maintain separation between access rights of different principals to dedicated sets of the resources while providing access control based on propagating permissions using the RBAC-based model. The cloud data center can define container memberships for different tenants, users, roles, or based on other aggregation criteria for identifying relevant principals provided with access to a particular container. In those cases, access to resources in a resource directory can be provided by filtering permissions propagated based on an authentication scheme defined by the RBAC model according to defined containers that map to different container policies. A container can be defined as a sub-directory (or sub-tree) of a resource directory managed by a cloud service in a cloud computing environment.

For example, a resource directory managed by a cloud service can be associated with two user groups—A and B. The two groups can be associated with two tenants defined at the cloud service. User group A can have access to all resources in the resource directory, and user group B can have access to a first sub-tree of the resource directory. For example, the cloud service can provide user group B with access to a first sub-tree X that extends from the root node of a tree structure of the resource directory.

In that example, the cloud service can define two containers, where the first one can be associated with all the resources of the resource directory and the second one can be associated with a portion of the resources. For example, the first container are defined as associated with the root node of the tree structure and all the child nodes to that root node. The second container can be associated with a root node of the first sub-tree X. The two containers can be associated with different policies for access for either of the two user groups. User group A can be associated with the first container (corresponding to all the resources), and user group B would be associated with the second container (corresponding to sub-tree X). The two groups A and B may include users with the same user role, for example, an administrator role.

The RBAC model may provide the administrator role with permissions to perform a certain operation on a resource, e.g., delete a resource. However, based on defining access rights according to the RBAC-based model and further filtered based on the definition of containers and container membership mapping tenants to containers, an administrator of user group B is not provided with rights to delete a resource that is outside of the second container. In particular, an administrator of user group B may not be allowed to delete a root node of the resource directory tree, however, an administrator of user group A could be allowed to delete that root node of the resource directory. In practice and for example, users of user group B may be provided with read access to the root node and other preceding nodes between the root node to the root node of the sub-tree X that form a direct path between the two nodes. In that example, users of user group B may not be provided with any access to read, write, and review, among other examples, for nodes that are outside the nodes of the sub-tree X and are not part of a direct route between the root node of the tree structure of the resource directory and the root node of the sub-tree X.

FIG. 1 is an example of a schematic diagram of a cloud environment 100 illustrating configuration of containers including resources of a hierarchical resource directory of a resource managing service using container membership definitions. In some instances, the cloud environment can provide hardware and software resources for running systems, application, services, and/or In some implementations, a data center 120 is a cloud platform providing resources to end users. The data center 120 can provide services associated with managing resources hosted at the data center 120. The data center 120 hosts a resource managing service 125 that provides access to resources defined at a directory 155. The directory 155 can be a hierarchically structured inventory for resources that can be shared with different users, where at least a portion of the resources are only accessible to some of the users that are associated with the resource managing service 125. The directory 155 can define a hierarchy of objects on which permissions for performing operations or access rights can be defined. The objects in the hierarchies can be grouped, for example, to form distinct nested sub-trees within a hierarchical tree structure.

The resource managing service 125 can support containerization by configuring containers for resources in the directory 155. The resource managing service 125 can configure containers for the directory and mapped to container memberships. A container membership can gather a group of users (e.g., defined according to a predefined rules, for example, all users of tenant A, and all users with a role "Administrator", among other examples) that share access rights to one or more containers defined as a set(s) of resources from the resources of the resource directory. The data center 120 can define containers as overlapping, partially overlapping, or distinct sets of resources at the hierarchical structure of the directory. The container membership can map a container as a portion of the resources to a designated group of principals. In some implementations, the data center maps different designated groups to distinguish between users of different tenants, accounts, user roles, user group, or other criteria for differentiation between users that are provided with access to different portions of the resources of the resource directory.

In some implementations, the directory 155 organizes the resources in a tree data structure, where different sets of resources can be associated with different sets of users according to an access policy rule. For example, one sub-tree of the tree structure can be associated with a first customer (or tenant) of the resource managing service 155, and a second sub-tree can be related to a second customer of the resource managing service 155. In some cases, the sub-trees can be separate structure that do not overlap, and in other cases, the sub-trees can be defined as nester and overlapping at least in part. For example, the directory 155 can organize resources similar to the organization of the resources at the inventory 210 of FIG. 2.

The data center 120 can provide mechanisms for restricting access to various parts of the system only to authorized users. The data center 120 includes an authorization server 135 that implements authorization schemes for managing access rights and privileges to users of the data center 120. The authorization server 135 can support access control restrictions based on an RBAC-based model 170. The RBAC-based model 170 can define different authorization schemes for different target groups of users to provide the users with access to at least part of the resources provided by the data center 120. The authorization server 135 can define authorization schemes 170 correspondingly for the different container memberships defined in the data center 120.

In some implementations, the data center 120 defines container definitions 130. The container definitions 130 can be associated with some or all of the resources provided by different services (and providing access to different directory of resources) running at the data center 120. For example, the container definitions 130 may include policies for containers defined for resources managed by the resource managing service 125. The resource managing service 125 can define a set of container policies from the container policies 140.

The container definitions 130 can map sets of resources identified as containers at a resource directory (associated with a service running at the data center 120) to sets of target principals (or users) that are provided with permissions and rights according to corresponding container policies 140. The container definitions 130 can include mappings 145 that associate a container identifier with a container membership. For example, a container defined for a set of resources at the directory 155 can be associated with a container definition at container definitions 130.

In some instances, a container identifier (used to identify a container from a given directory) is associated with an identifier of a root node of the container that is a sub-tree of a hierarchical structure of resources. The container membership can be associated with a rule to evaluate claims written in tokens provided by users when logging in the data center 120. For example, the resource managing service 125 can define a sub-tree from the directory 155 as a container mapped to users that are of a user group A, or all users from a given account, among other example grouping. The resource managing service 125 (or other services part of the data center 120) can define container policies 140 for each different container mapping defined at the mappings 145. The container policies 140 can provide rules for access rights for users that when logged are determined to correspond to a particular container membership. The container policies 140 can define specific rules for providing access rights and privileged to users of a given container membership mapped to a particular container.

In some implementations, one container defined in the mappings 145 corresponds to multiple container memberships, and one container membership may be associated with multiple containers. For example, a first sub-tree container can be accessible by users of group A, B, and C, while users of group A can be provided with permissions to another different container in addition to the first sub-tree container.

In some implementations, the authorization server 135 defines authorization schemes 170 for different containers as defined in the container definitions 130 to differentiate between provided rights and privileges of users associated with the different container memberships. The authorization schemes 170 defined according to the RBAC-based model can include a set of schemes that correspond to the different container memberships. For example, a container can include a sub-tree of the resource directory, and the container can be mapped to a designated group of users that are provided with permissions and privileges related to resources in that container (e.g., a sub-tree). A definition of a group of users associated with a particular container can define a container membership. In some instances, the data center 120 can provide users corresponding to a container membership associated with a user group A that is mapped to a container A with a set of primitives that are different from the set of primitives provided to a user of another user group, if that user group is not mapped to the same containers as the user group A.

The authorization schemes 170 include a first authorization scheme 175 for container membership 1 that defines primitives relevant for users that qualify to meet criteria associated with container membership 1. The data center 120 can provide users associated with container membership 1 to authenticate at the data center 120 and be provided with authorization primitives corresponding to the first authentication scheme 175. When propagating access controls to resources for such users, services at the data center can provide access to resources from directory 155 based on filtering of the authorization primitives according to the container policy for the mapped container to the container membership 1 at the container definition 130.

For example, if a container defined at the directory 155 that corresponds to a sub-tree K is associated with a tenant account N, users associated with the tenant account N can have a container membership for the sub-tree K. Thus, a user of the tenant account N can be provided with permissions and privileges that correspond to their role according to the relevant authorization scheme for those resources of the resource directory that are part of the sub-tree K.

In some implementations, the resource managing service 125 provides a container configuration interface 150 for accessing (and sending requests) by user B 115 to configure containers for sets of resources at the directory 155. The container configuration interface 150 can be an application programming interface (API) that provides methods for configuring containers at the directory 155. The configuration of such containers can be recorded locally at a local database 152. The user B 115 can request to configure a first container by providing an identifier of the container and an identifier of a root node of a sub-tree from the hierarchical structure of resources at the directory 155. Based on the provided container identifier and the root node identifier of the container, the container configuration interface 150 can request, from the mappings 145 at the container definitions 130, a relevant mapping associated with this container identifier to gather information for the mapped container membership to that container identifier. For example, the container membership may identify that the requested container for configuration is associated with users originating from domain "XYZ." In response to obtaining the container membership information from the mappings 145, the container configuration interface 150 can store the defined container for the directory 155 by persisting such configuration information at the database 152.

In some implementations, a user X 105 requests to access resources at directory 155 that are provided by the resource managing service 125. For example, the user X 105 can request the access through a client application 110 (e.g., a browser). The user X 105 can authenticate at the client 110. The resource management service 125 can determine that the user X 105 is authorized to perform operations and can provide the user X 105 with access control rights at the resource managing services based on a token authentication. For example, the user X 105 can provide a user name and a password to obtain a token from an identity provider that can be used for issuing a local token relevant for the data center 120 that can be evaluated for determining local authorization. For example, the resource managing service 125 can receive the local token of the requesting user X 105 and can parse the token to read claims defined in the token to determine a container membership of the user X 105 for accessing resources at the directory 155. The authorization server 135 can determine the relevant container membership authorization scheme from the authorization schemes 170. Based on read information (e.g., claims written in the token) from the token of the user X 105, the resource management service 125 can determine which containers from the defined containers for directory 155 are associated (or available) for the user X 105. Further based on a determined container membership, an authorization manager 160 can acquire a relevant authorization scheme from the authorization schemes 170 at the authorization server 135. The authorization manager 160 can interact with the authorization server 135 and gather an authorization scheme 165, as a relevant authorization scheme including relevant primitives part of the authorization schemes 170. The authorization scheme 165 at the resource managing service 125 includes replicated primitives associated with user X, where that the relevant primitives correspond to the container membership for the user X 105. The authorization scheme 165 can includes primitives for user X 105 relevant for providing access to resources from the directory 155. The authorization manager 160 can replicate the authorization scheme 165. Based on the authorization scheme 165 and a container policy associated with the container membership determined for user 105, access rights for the user can be filtered and access to resources in the directory 155 can be provided. The resource managing service 125 can provide the user X 105 with access to resources that are part of the container, which is mapped to the container membership determined for the user X 105.

In some implementations, authorization primitives are grouped by respective containers (or container memberships) defined for the data center 120 at the authentication schemes 170 at the authorization server 135. In those cases, when the user 105 logs on at the data center 120 to request services from the resource manager 125, the token 102 of the user 105 can be parsed to determine claims written in the token to identify a corresponding container related to at least one of the claims. For example, the token can include a claim that can define a domain of the user. Based on the identified domain, mappings 145 can be searched to determine a container identifier that corresponds to the domain defined in the token's claim.

In accordance with the determined container identifier, the resource manager 125 can send a request to the authorization server 135 to determine authorization primitives associated with the identified container identifier. Thus, the authorization schemes 170 can be searched to determine whether a container membership including authorization primitives is stored at the authorization server 135 that corresponds to the determined container identifier. If such authorization primitives associated with the container identifier are determined, then the authorization primitives can be loaded by the authorization manager 160 (e.g., replicated primitives at 165). In some instance, such authorization primitives may not be found (e.g., there are no stored authorization primitives defined for that container). In some of those cases, authorization primitives associated with a "default" container or default authorization primitives can be used. For example, the authorization primitives 170 may include authorization primitives that are designed as default.

In some instances, the "default" authorization primitives container can be a container that is applied to users whose token claim cannot be associated with a container identifier (e.g., there is no mapping that can be evaluated to correspond to the user). In some other instances, the "default" authorization primitives container can be a container that is applied to users whose token claim can be mapped to a container identifier defined in the data center 120, however, there may be no special authorization primitives defined at the authorization server 135 for that container identifier. In some implementations, the user X 105 requests access to resources in the directory 155, where the directory 155 includes seven containers as presented at inventory 210 of FIG. 2.

Figure 2:
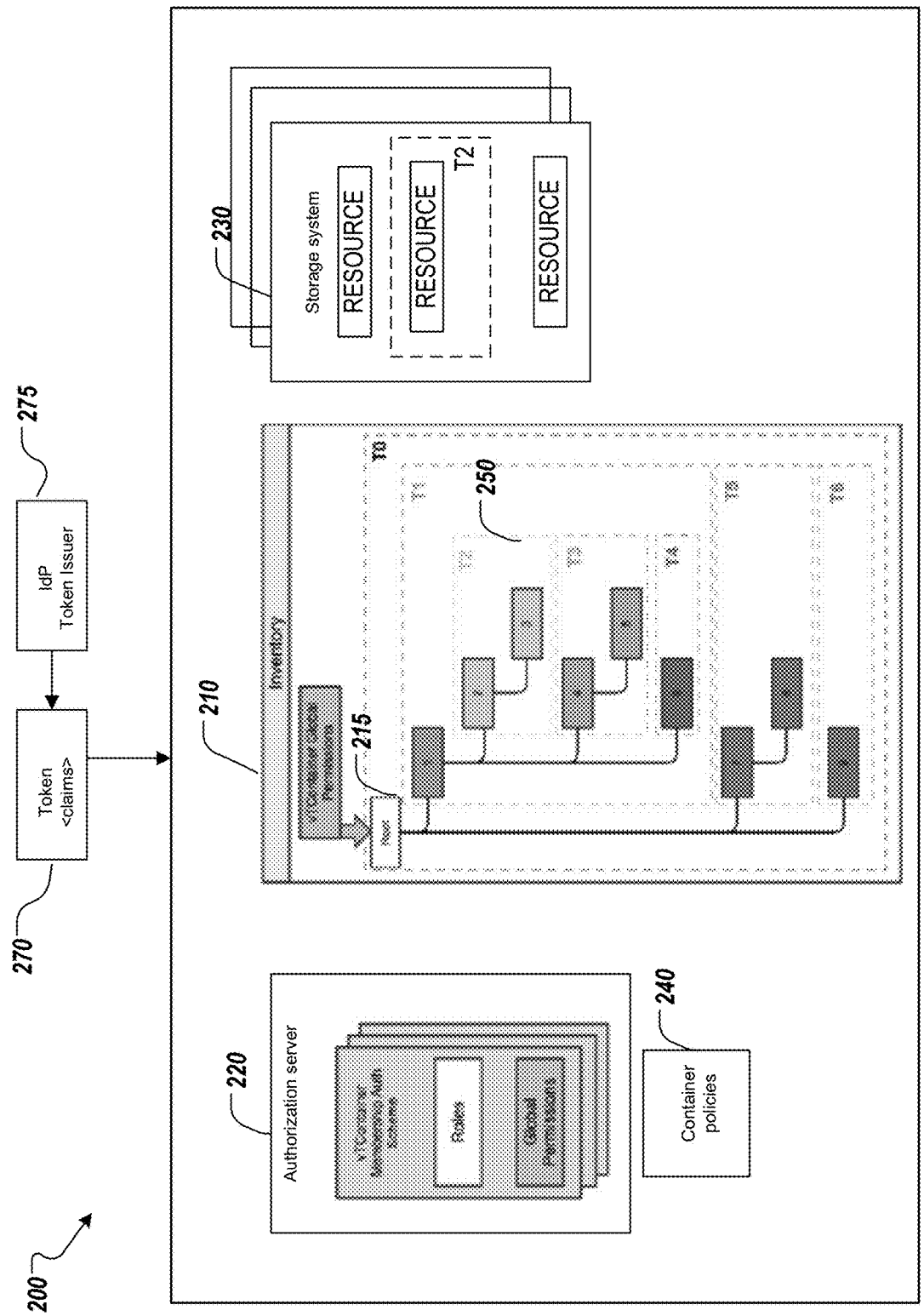
FIG. 2 is an example of a schematic diagram of a cloud data center providing an hierarchical inventory of resources to multiple different groups of users based on defined container policies for authorization.

FIG. 2 is an example of a schematic diagram 200 of a cloud data center 205 providing an hierarchical inventory 210 of resources to multiple different groups of users based on defined container policies for authorization.

The cloud data center 205 includes an inventory 210 for managing resources stored at a storage system 230 at the cloud data center 205. The inventory 210 can include defined containers that can be associated with container mappings to relate container identifiers to container memberships based on rules for determining a membership of a logged-in user to a particular container membership.

The cloud data center 205 includes an authorization server 220 that implements authorization schemes for managing access rights and privileges for users of the data center 120 with respect to resources defined at the inventory 210. The authorization server 220 can be substantially similar to the authorization server 135 of FIG. 1. The authorization server 220 can define one or more authorization schemes, where the authorization schemes can be mapped to different container memberships defined for the cloud data center 205 at the container policies 240. The authorization schemes at the authorization server 220 can support access control restrictions based on an RBAC-based model and can include roles, global permissions for the cloud data center 205, and inventory permissions for inventory objects included in the inventory 210. The different authorization schemes and their definition based on configured containers and container memberships can be performed as described in FIG. 1.

In some implementations, a resource managing service or a storage service manages the inventory 210 to provide access to resource of the inventory 210. The inventory 210 can be similar to the directory 155. The inventory 210 is defined with a typical hierarchical inventory structure. The inventory 210 includes blocks or nodes that correspond to inventory objects. Multiple containers can be configured for the inventory 210. The service can configure containers, for example, as discussed in FIG. 1 in association with the resource managing service 125.

In some implementations, the resource managing service defines a container for a set of resources at the inventory 210 that correspond to resources complying with certain criteria. For example, a container such as container "T2" 250 can be defined to include critical system resources that should be managed by principals that correspond to the cloud data center provider's account. In that example, the resource managing service can define the container "T2" 250 to correspond to a container membership associated with user that are logged in user accounts belonging to the data center provider's domain.

An authorization scheme associated with the data center provider's domain can propagate rights to users for accessing resources at the inventory 210, where the rights can be filtered based on the defined container policies 240. In the example with a user corresponding to the data center provider's domain, the resource managing service can provide access to resources within the container "T2" 250 to such a user, while access to those resources (i.e., node 2 and 3) cannot be provided to users that cannot be determined as associated with a container membership that is mapped to the container identifier of container "T2" 250. In practice, the definition of such a container can limit access to resources 2 and 3 part of the container "T2" 250 for users that do not correspond to a container membership defined as allowed to access these resources. For example, a user of a first customer logged in on the cloud data center 205 may not be provided with access rights for resources 2 and 3, as the access rights provided to such a user can be filtered based on the container memberships associated with that user.

In some implementations, a container definition can be interpreted as an abstraction over the authorization model of the cloud data center 205 that defines a permission propagation boundary to support definition of independent sub-inventory hierarchies in the inventory 210.

In some implementations, when a user requests to log into the cloud data center 205, the user provides a token 270 that is issued by an identity provider issuer 275. The provided token 270 can be exchanged to a local token 102 at the cloud data center 205, where the cloud data center 205 can evaluate the local token to determine permissions provided to the requesting user. The authorization server 220 can read the token to extract token claims and the token claims can be used to determine container memberships. For example, a definition of a user role can be a portion of the token claims, a definition of a user group can be a portion of the token claims, or a domain of the user account can be part of the token claims, among other examples of claims. The claims in the token can be used to evaluate mappings between container memberships and containers, to determine how to propagate rights to the resources from the inventory based on a relevant authorization scheme.

The inventory 210 includes seven containers defined to restrict access rights to different subset of the resources to different target groups. The containers can be defined as nested sets. For example, container T0 includes containers T1, T5, and T6, while container T1 includes containers T2, T3, and T4. One container can be configured to map to different container memberships.

The resource managing service can execute such a configuration through executing one or multiple requested configurations at an interface (not shown) provided by the data center 205. Such interface can be similar to the container configuration interface 150 of FIG. 1.

For example, a user can be determined, based on a claim in the token provided with a request to access the inventory 210, to be part of container membership T2 that is mapped to container T2 with a root node 2. When the data center 205 provides access to resources from the inventory to such a user, the resource managing service can provide the user with access rights to read and view the root node of the inventory 210 and to node 1 (as an immediate predecessor of node 2 that is the root node of container T2). The user will keep their authorization level unchanged in relation to any resource that is within the container T2. In some cases not shown on FIG. 2, if container T2 includes another container as a nested container, the user who is provided with authorization for the parent container T2 would be provided with the same authorization level for resources within the nested container as well. When the inventory 210 is evaluated and access rights for the user are determined, the access rights as defined in the relevant authorization scheme would be filtered based on the container definitions and mapping to container memberships, and the user will receive a subset of the rights that are provided from the authorization scheme.

Figure 3:
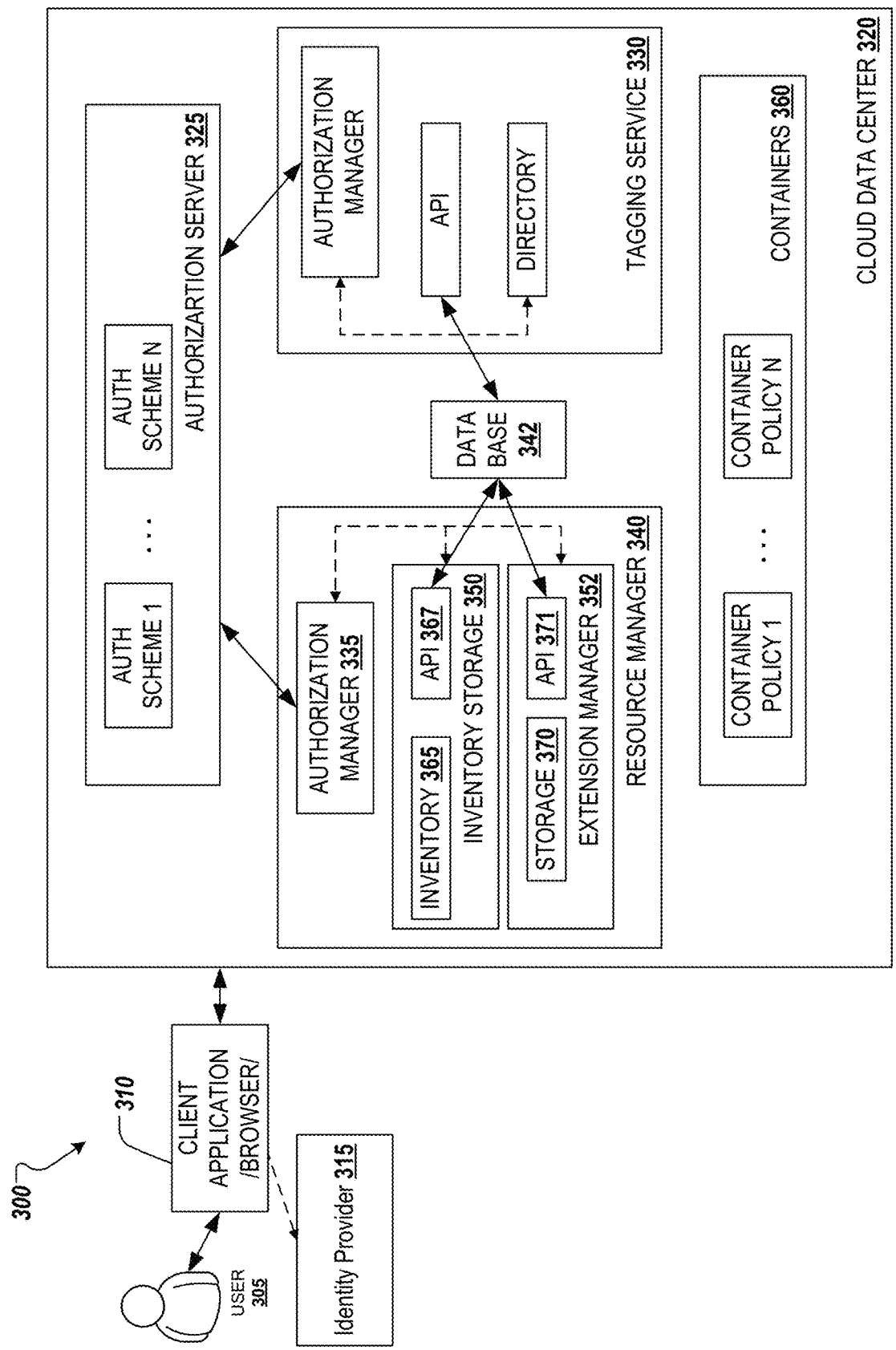
FIG. 3 is an example of a schematic diagram of a cloud data center hosting cloud services providing access to resources to groups of users based on container policy definitions configured at the data center.

FIG. 3 is an example of a schematic diagram 300 of a cloud data center 320 hosting cloud services providing access to resources to groups of users based on container policy definitions configured at the data center.

In some implementations, the cloud data center 320 can be substantially similar to the data center 120 of FIG. 1 and the cloud data center 205 of FIG. 2. The cloud data center 320 can be a cloud platform providing multiple resource managing services including a resource manager 340 and a tagging service 330. However, the cloud data center 320 can provide further resource managing services that provide access to resources organized in a hierarchical inventory and where access rights are propagated based on the RBAC model as previously discussed. The resource manager 340 is associated with managing access control to resources at an inventory 365 and a storage 370, while the tagging service 330 manages access control to resources at a directory 375. The cloud data center 320 provides services for managing resources with information for authentication permissions associated with access right for inventory objects and global permissions and roles associated with different target groups for the respective services.

In some implementations, the resource manager 340 includes an extension manager 352 as a service for managing resources at the storage 370 and an inventory storage 350 as a service for managing resources at the inventory 365. The resource manager 340 can include one authorization manager 335 to handle authorization requests for resources at either the inventory 365 or the storage 370.

The cloud data center 320 includes an authorization server 325 that can be similar to the authorization server 135 of FIG. 1 and the authorization server 220 of FIG. 2. The authorization server 220 can define authorization schemes for different container memberships mapped to containers configured for resource directories at services at the cloud data center 320. For example, a set of the authorization schemes at the authorization server 325 correspond to container memberships defined for containers at an inventory 365 and other set correspond to containers at a storage 370 as inventories managed at the resource manager 340.

In some implementations, the resource manager 340 and the tagging service 330 store configurations for containers defined at respective inventory, storage, or directory at a database 342 that is local for the cloud data center 320.

In some implementations, when a user 305 requests to log, for example, through a client application 310, to the resource manager 340 at the cloud data center 320, the authorization server 325 processes the request. The authorization server 325 has logic to determine whether a container membership associated with the user 305, for example, by evaluating a membership rule defined for the container membership. The authorization server 325 can determine a relevant authorization scheme for the user 305 that includes authorization primitives associated with that container membership. For example, the user may be from account "test" that is provided as part of the token used for authenticating at the data center 320, and the account "test" can be determined to correspond to container membership T2 mapped to container T2 (e.g., container T2 of the inventory 210 of FIG. 2). The authorization server 325 can load the authorization primitives that include inventory permissions associated with T2 and use those primitives to propagate rights for accessing resources at the inventory 365 at the resource manager 340. The authorization server 325 can provide the authorization primitives relevant for T2 to the authorization manager 335 to be locally persisted, for example, at the authorization manager 335. The replicated primitives relevant for container membership T2 can be filtered when traversing the hierarchical structure of the inventory to propagate permissions that are filtered according to containers that are mapped to the container membership of the user.

In some implementations, the definition of containers and container memberships supports a separation mechanism between different authorization primitives, for example, roles and permissions, for different tenants defined at the cloud data center 320. In such cases, two users having the same role but related to different tenants can be provided with different permissions for accessing resources at one common resource directory. For example, two customers of the cloud data center can have roles with equal names but with different effective privilege sets to access resources within a common storage that are not separated and/or isolated to support the access restrictions. Based on definition of containers and mapping them to different container membership definitions, a new customer requesting to consume the services of the cloud data center 320 can be easily on-boarded and provided with access to some or all of the resources without modifications in the roles definitions of users from the customer's domain.

Figure 4:
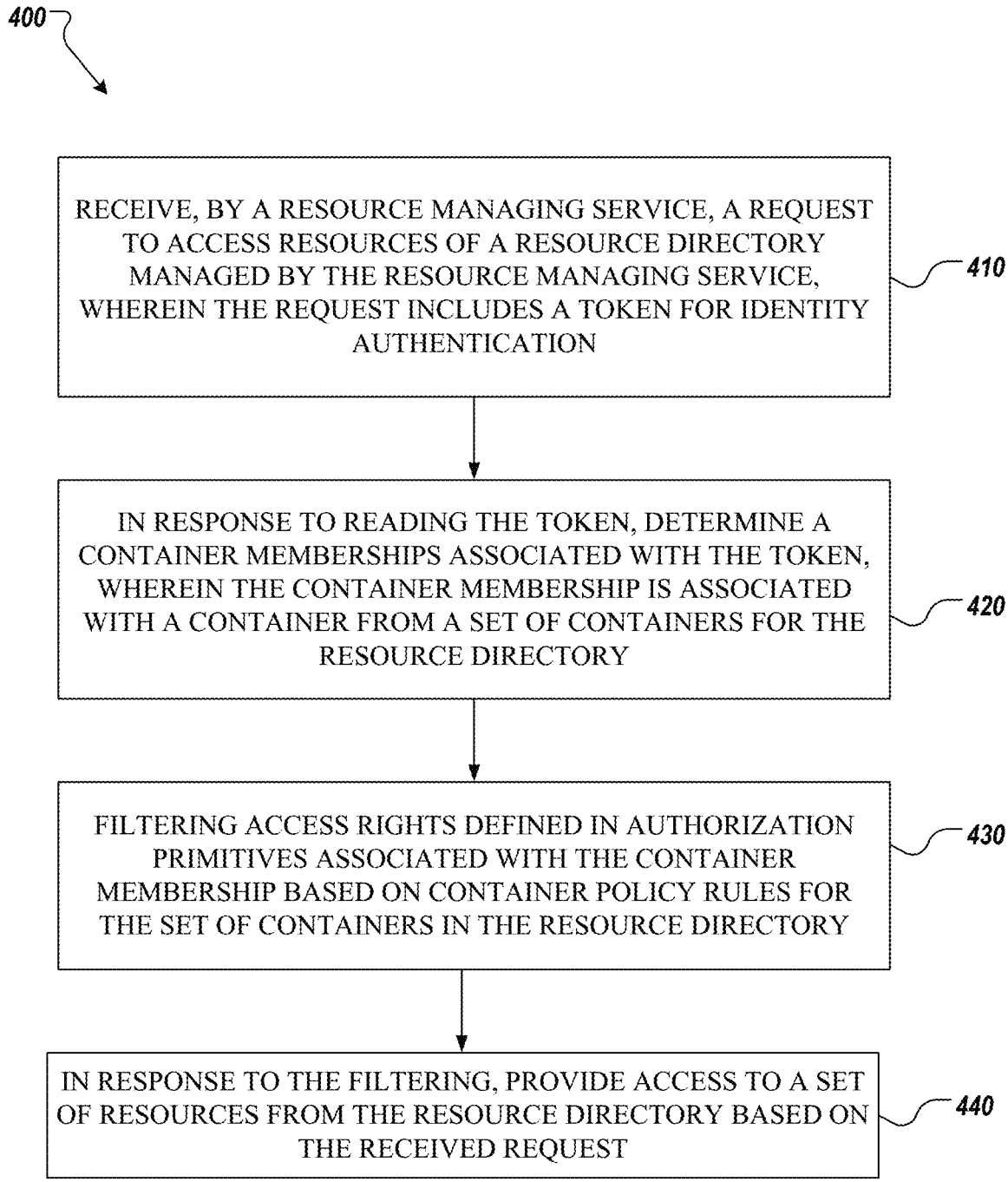
FIG. 4 is an example of a flowchart of an example process for resource access management.

FIG. 4 is an example of a flowchart of an example process 400 for resource access management in accordance with some embodiments. The example process 400 can be executed at a cloud-service computing environment that can be substantially similar to the cloud environment 100 of FIG. 1, the cloud environment 200 of FIG. 2, or the cloud environment 300 of FIG. 3. The example process 400 can be executed in relation to one or more resource managing services as discussed at FIGS. 1, 2, and 3. The resource managing services can manage resources defined in a hierarchical structure. Access to resources can be based on propagation of rights according to the RBAC model.

For convenience, the process 400 will be described as being performed by a system of one or more computers, located in one or more locations, and programmed appropriately in accordance with this specification. For example, a resource managing service at a cloud data center system, e.g., the resource managing service 125 at the data center 120 of FIG. 1, the resource manager 340 and the tagging service at the cloud data center 320 of FIG. 3, appropriately programmed, can perform the process 400.

At 410, a resource managing service receives a request to access resources of a resource directory. The resource managing services manages the resource directory. For example, the resource directory can be substantially similar to the directory 155 of the resource managing service 125 of FIG. 1, the inventor 210 of FIG. 2, the inventory wherein the request includes a token for identity authentication. In some implementations, a cloud data center (e.g., data center 120 of FIG. 1, cloud data center 205 of FIG. 2, cloud data center 320 of FIG. 3) hosts the resource managing service. The cloud data center can provide access control policies based on authorization schemes defined at an authorization server. The authorization server can be similar to the authorization server 135 of FIG. 1, authorization server 220 of FIG. 2, or authorization server 325 of FIG. 3.

At 420, in response to reading the token, the resource managing service determines a container membership based on reading the token provided for identity authentication. The container membership is associated with a container from a set of containers defined for the resource directory. The resource managing service can define containers similarly to the definition of containers presented at FIG. 1 and FIG. 2. For example, the resource directory can be similar to the inventory 210 of FIG. 2. A container can include one or more resources in a tree data structure of the resource directory. In some implementations, the resource managing service defines a container as a sub-tree of a tree structure of the resource directory that can be identified by their sub-tree root node.

In some implementations, the resource managing service determines container membership based on evaluating mappings between each of the set of containers and a corresponding membership rule. In some implementations, the data center has preconfigured containers for a given resource directory of a given resource managing service at the cloud-services computing environment. For example, the containers can be configured through a configuration Application Programming Interface (API) that can be similar to the container configuration interface 150 of FIG. 1.

The evaluated mappings may be similar to the mappings 145 of FIG. 4. The mappings may include a correspondence between a container identifier and a container membership. A user associated with a request for accessing resources can be evaluated to correspond to multiple container memberships and to respective multiple containers defined for a resource directory. In some implementations, a membership rule associated with the container membership is evaluated based on a read token from the request for accessing resources of the resource directory to identify a principal associated with the received request.

In some implementations, the container membership is associated with an account configured at the cloud-services computing environment. In some instances, the resource managing service provides users of a given user role (e.g., administrator, developer, tester, etc.) defined within the account with a first set of access rights to the container from the set of containers defined for the resource directory. For example, an administrator logged in from that account can be provided with access rights for an administrator (e.g., full read and write right) for resources that are part of mapped containers to the container membership. According to this example, a user logged-in as an administrator of a first account, even if provided with administrator rights according to an authorization scheme of the RBAC model, would be provided with those rights for those of the resources that the administrator is mapped to. An authorization server can define the set of rights in the authorization primitives associated with the container membership.

In some implementations, if multiple accounts are registered in a cloud-service computing environment and the same role is defined for each of these accounts (e.g., each accounts includes the user role of an administrator), a user logged as an administrator would be provided with administrator rights only to resources that corresponds to containers mapped to a container membership associated with their account. Thus, the resource managing service can split access to resources based on container membership level while the resources are organized in a common directory having a single hierarchical structure that is not physically separated.

At 430, the resource managing service filters authorization primitives associated with the container membership determined for the request based on container policy rules defined for the set of containers in the resource directory to determine filtered access rights for the request. In some implementations, in response to the determined container membership, an authorization manager of the resource managing service receives the authorization primitives for the resources of the resource directory from an authentication server. The authorization primitives can include access rights provided to user roles for execution of operations associated with one or more resources of the resource directory.

At 440, in response to the filtering 430, the resource managing service provides a set of resources from the resource directory for accessing based on the received request. In some implementations, access to the resources of the resource directory is defined based on an RBAC model. The RBAC model can define a plurality of authorization schemes correspondingly associated with a plurality of container memberships. The plurality of authorization schemes can correspond to the authorization schemes 170 at the authorization server 135 of FIG. 1.

Embodiments of the subject matter described in this specification include computer systems, apparatus, and computer programs recorded on one or more computer storage devices, each configured to perform the actions of the described methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Example 1 is a method for access management in a cloud-services computing environment, the method comprising:
    receiving, by a resource managing service, a request to access resources of a resource directory managed by the resource managing service, wherein the request includes a token for identity authentication;
    in response to reading the token, determining a container membership associated with the token, wherein the container membership is associated with a container from a set of containers for the resource directory, wherein the container includes one or more resources in a tree data structure of the resource directory;
    filtering access rights defined in authorization primitives associated with the container membership based on container policy rules for the set of containers in the resource directory; and
    in response to the filtering, providing access to a set of resources from the resource directory based on the received request.

Example 2 is a method according to the method of Example 1, further comprising:
    in response to the determined container membership, receiving the authorization primitives for the resources of the resource directory from an authentication server.

Example 3 is a method according to any one of the previous Examples, wherein the authorization primitives include access rights provided to user roles for execution of operations associated with one or more resources of the resource directory.

Example 4 is a method according to any one of the previous Examples, wherein access to the resources of the resource directory is defined based on a role-based access control model defining a plurality of authorization schemes correspondingly associated with a plurality of container memberships.

Example 5 is a method according to any one of the previous Examples, wherein the container membership is determined based on evaluating mappings between each of the set of containers and a corresponding membership rule, wherein a membership rule is evaluated based on a read token from the request for accessing resources of the resource directory to identify a principal associated with the received request.

Example 6 is a method according to any one of the previous Examples, wherein the container membership is associated with an account configured at the cloud-services computing environment, wherein users of a given user role defined within the account are provided with a first set of access rights to the container from the set of containers defined for the resource directory, wherein the first set of access rights are defined in the authorization primitives associated with the container membership.

Example 7 is a method according to any one of the previous Examples, wherein the set of containers in the resource directory are organized as nested sub-trees to a root node of the resource directory, and wherein each container is associated with permissions mapping a user role to an access level.

Example 8 is a method according to any one of the previous Examples, wherein the method further comprises:
   receiving, at a container configuration interface provided by the resource managing service, a request to configure a first container from the set of containers, wherein the request identifies the first container based on a container identifier and a resource corresponding to a root node of the container as a sub-tree of the resource directory;
   in response to the container identifier, determining a container membership claim corresponding to the container identifier at a mapping structure defining the set of containers for the resource directory; and persisting, by the container configuration interface, the container membership claim at a local data storage.

Example 9 is a non-transitory, computer-readable medium coupled to one or more processors and having instructions stored thereon which, when executed by the one or more processors, cause the one or more processors to perform the method of any one of the previous Examples.

Example 10 is a system comprising: one or more computers and one or more storage devices storing instructions that are operable, when executed by the one or more computers, to cause the one or more computers to perform the method of any one of the previous Examples.

While this specification contains many specific implementation details, these should not be construed as limitations on the scope of any implementation or on the scope of what may be claimed, but rather as descriptions of features that may be specific to particular implementations of the disclosure. Certain features that are described in this specification in the context of separate implementations can also be implemented in combination or in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In certain implementations, multitasking and parallel processing can be advantageous.

What is claimed is:

1. A method for access management in a cloud-services computing environment, the method comprising:
   receiving, by a resource managing service, a request to access resources of a resource directory managed by the resource managing service, wherein the request includes a token for identity authentication of a user;
   in response to reading the token, determining a container membership associated with the user, wherein the container membership maps the user to a container from a set of containers for the resource directory, wherein the container groups a set of resources in a tree data structure of the resource directory;
   filtering access rights defined in authorization primitives associated with the container membership based on container policy rules for the set of containers in the resource directory; and
   in response to the filtering, providing access to the set of resources from the resource directory based on the received request.

2. The method of claim 1, further comprising:
   in response to the determined container membership, receiving the authorization primitives for the resources of the resource directory from an authentication server.

3. The method of claim 1, wherein the authorization primitives include access rights provided to user roles for execution of operations associated with one or more resources of the resource directory.

4. The method of claim 1, wherein access to the resources of the resource directory is defined based on a role-based access control model defining a plurality of authorization schemes correspondingly associated with a plurality of container memberships.

5. The method of claim 1, wherein the container membership is determined based on evaluating mappings between each of the set of containers and a corresponding membership rule, wherein a membership rule is evaluated based on a read token from the request for accessing resources of the resource directory to identify a principal associated with the received request.

6. The method of claim 1, wherein the container membership is associated with an account configured at the cloud-services computing environment, wherein users of a given user role defined within the account are provided with a first set of access rights to the container from the set of containers defined for the resource directory, wherein the first set of access rights are defined in the authorization primitives associated with the container membership.

7. The method of claim 1, wherein the set of containers in the resource directory are organized as nested sub-trees to a root node of the resource directory, and wherein each container is associated with permissions mapping a user role to an access level.

8. The method of claim 1, further comprising:
receiving, at a container configuration interface provided by the resource managing service, a request to configure a first container from the set of containers, wherein the request identifies the first container based on a container identifier and a resource corresponding to a root node of the container as a sub-tree of the resource directory;
in response to the container identifier, determining a container membership claim corresponding to the container identifier at a mapping structure defining the set of containers for the resource directory; and
persisting, by the container configuration interface, the container membership claim at a local data storage.

9. A non-transitory, computer-readable medium coupled to one or more processors and having instructions stored thereon which, when executed by the one or more processors, cause the one or more processors to perform operations, the operations comprising:
receiving, by a resource managing service, a request to access resources of a resource directory managed by the resource managing service, wherein the request includes a token for identity authentication of a user;
in response to reading the token, determining a container membership associated with the user, wherein the container membership maps the user to a container from a set of containers for the resource directory, wherein the container groups a set of resources in a tree data structure of the resource directory;
filtering access rights defined in authorization primitives associated with the container membership based on container policy rules for the set of containers in the resource directory; and
in response to the filtering, providing access to the set of resources from the resource directory based on the received request.

10. The computer-readable medium of claim 9, wherein the computer-readable medium further stores instructions which when executed by the one or more processors, cause the one or more processors to perform operations comprising:
in response to the determined container membership, receiving the authorization primitives for the resources of the resource directory from an authentication server.

11. The computer-readable of claim 9, wherein the authorization primitives include access rights provided to user roles for execution of operations associated with one or more resources of the resource directory.

12. The computer-readable of claim 9, wherein access to the resources of the resource directory is defined based on a role-based access control model defining a plurality of authorization schemes correspondingly associated with a plurality of container memberships.

13. The computer-readable of claim 9, wherein the container membership is determined based on evaluating mappings between each of the set of containers and a corresponding membership rule, wherein a membership rule is evaluated based on a read token from the request for accessing resources of the resource directory to identify a principal associated with the received request.

14. The computer-readable of claim 9, wherein the container membership is associated with an account configured at the cloud-services computing environment, wherein users of a given user role defined within the account are provided with a first set of access rights to the container from the set of containers defined for the resource directory, wherein the first set of access rights are defined in the authorization primitives associated with the container membership.

15. The computer-readable medium of claim 9, wherein the set of containers in the resource directory are organized as nested sub-trees to a root node of the resource directory, and wherein each container is associated with permissions mapping a user role to an access level.

16. The computer-readable medium of claim 9, wherein the computer-readable medium further stores instructions which when executed by the one or more processors, cause the one or more processors to perform operations comprising:
receiving, at a container configuration interface provided by the resource managing service, a request to configure a first container from the set of containers, wherein the request identifies the first container based on a container identifier and a resource corresponding to a root node of the container as a sub-tree of the resource directory;
in response to the container identifier, determining a container membership claim corresponding to the container identifier at a mapping structure defining the set of containers for the resource directory; and
persisting, by the container configuration interface, the container membership claim at a local data storage.

17. A system comprising:
one or more computers and one or more storage devices storing instructions that are operable, when executed by the one or more computers, to cause the one or more computers to perform operations comprising:
receiving, by a resource managing service, a request to access resources of a resource directory managed by the resource managing service, wherein the request includes a token for identity authentication of a user;
in response to reading the token, determining a container membership associated with the user, wherein the container membership maps the user to a container from a set of containers for the resource directory, wherein the container includes groups a set of resources in a tree data structure of the resource directory;
filtering access rights defined in authorization primitives associated with the container membership based on container policy rules for the set of containers in the resource directory; and
in response to the filtering, providing access to the set of resources from the resource directory based on the received request.

18. The system of claim 17, wherein the one or more computers further perform operations comprising:
m response to the determined container membership, receiving the authorization primitives for the resources of the resource directory from an authentication server.

19. The system of claim 17, wherein the authorization primitives include access rights provided to user roles for execution of operations associated with one or more resources of the resource directory.

20. The system of claim 17, wherein access to the resources of the resource directory is defined based on a role-based access control model defining a plurality of authorization schemes correspondingly associated with a plurality of container memberships.

21. The system of claim 17, wherein the container membership is determined based on evaluating mappings between each of the set of containers and a corresponding membership rule, wherein a membership rule is evaluated based on a read token from the request for accessing resources of the resource directory to identify a principal associated with the received request.

22. The system of claim 17, wherein the container membership is associated with an account configured at the cloud-services computing environment, wherein users of a given user role defined within the account are provided with a first set of access rights to the container from the set of containers defined for the resource directory, wherein the first set of access rights are defined in the authorization primitives associated with the container membership.

23. The system of claim 17, wherein the set of containers in the resource directory are organized as nested sub-trees to a root node of the resource directory, and wherein each container is associated with permissions mapping a user role to an access level.

24. The system of claim 17, wherein the one or more computers further perform operations comprising:
- receiving, at a container configuration interface provided by the resource managing service, a request to configure a first container from the set of containers, wherein the request identifies the first container based on a container identifier and a resource corresponding to a root node of the container as a sub-tree of the resource directory;
- in response to the container identifier, determining a container membership claim corresponding to the container identifier at a mapping structure defining the set of containers for the resource directory; and
- persisting, by the container configuration interface, the container membership claim at a local data storage.

* * * * *